UNITED STATES PATENT OFFICE.

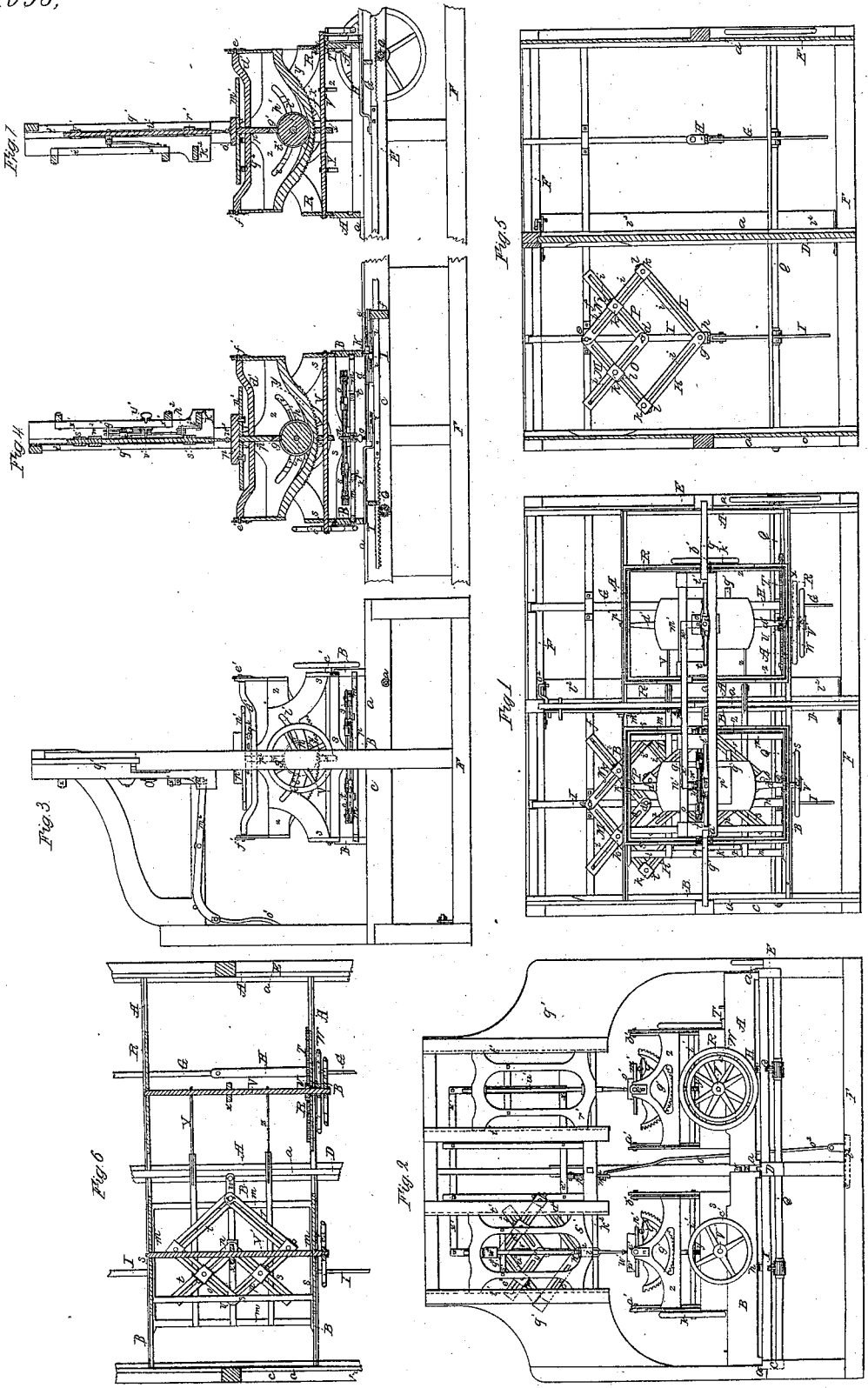

HEZEKIAH AUGUR, OF NEW HAVEN, CONNECTICUT.

CARVING-MACHINE.

Specification of Letters Patent No. 6,058, dated January 23, 1849.

*To all whom it may concern:*

Be it known that I, HEZEKIAH AUGUR, of New Haven, in the county of New Haven and State of Connecticut, have invented a new and useful Improved Machine for Carving Wood or other Material or Making Copies of Carvings or Sculptures or Ornamental Work in Alto or Basso Rilievo; and I do hereby declare that same is fully described and represented in the following specification and accompanying drawings, letters, figures, and references thereof.

Of the said drawings Figure 1, denotes a top view of my said machine. Fig. 2, is a front elevation of it. Fig. 3, is a side elevation of it. Fig. 4, is a vertical and transverse section taken through the cutting tool. Fig. 5, is a horizontal section taken just above and so as to exhibit the lower system of jointed proportional bars. Fig. 6, is a horizontal section taken through the central or transverse shafts of the two upper movable carriages, and so as to exhibit the system of jointed proportional bars, and mechanism by which they are connected and moved in lateral directions either one way or in the opposite. Fig. 7, is a transverse section of the machine taken through the pattern spindle and looking toward its end of the frame.

My improved machine in many respects is very much like the machine described in the specification of Letters Patent of the United States, granted to me on the twenty-third day of December, A. D. 1846, the principal or distinguishing difference being, that my present improved machine is capable of carving or producing copies larger or smaller than the original bas relief, and in any desired proportion or proportions within its limits, whereas my former machine or that heretofore patented would only produce a copy of the same size of the original ornament. The chucks or tablets of my improved machine besides having mechanism applied to them to vary or change their horizontal inclination in lateral and transverse directions, are, together with such mechanism supported on movable carriages, which are so connected by a system of proportional jointed rods or bars as to be moved laterally the one faster than the other, or at equal or such proportionate speeds as occasion may require, the said carriages in turn being sustained and made to move on two other carriages which in their turn are connected by a similar system of proportional rods or bars and mechanism which regulate their respective velocities of movement in transverse directions or directions at right angles to those of the carriages first named. The cutting tool and guide spindle are also similarly connected by a system of proportional bars which regulate their vertical movements, or cause one to rise or fall faster than the other, as circumstances may require. All this I shall now proceed to describe commencing first with the explanation of the lower set of carriages and their connecting and operating mechanism.

The said carriages are seen at A, B, in the drawings. They are square or rectangular frames arranged side by side and supported on three parallel rails or stringers C, D, E, of the main supporting frame F. Each of the said carriages is sustained between two parallel guides $a$, $a$, and so as to allow of it being moved in a transverse direction on its supporting rails. A long sliding rack bar G, is placed transversely under the carriage A, and is connected to said carriage by an arm H. There is also another and similar rack bar I, disposed in a similar manner under the carriage B. The said bar I, is connected by a pin $d$, to a system of jointed thin or flat parallel bars or rules K, L, M, N, O, P, arranged together as seen in Fig. 5, the said pin $d$, being at the the angle or point of connection of the two bars O, P. The two bars M, N, play on a joint pin $e$, which is made stationary and to project upward from a fixed bar $f$, of the main frame. The joint pin $g$, at the angle of connection of the two bars K, L, passes through one end of a bar $h$, arranged over the rack bar I, and connected at its other end to the carriage B.

Each of the bars K, L, M, N, O, P, is made with a long slot $i$, which extends nearly from end to end of it, and on each bar where the two bars O, P, are jointed to the bars M, N, and where the two bars M, N, are jointed to the two bars K, L, there is a slide $k$, through which the joint pin is made to pass, and in which it is secured, two of said slides, being applied to each joint pin of the joints which connect the bars M and N, with the bars O, P, or with the bars K, L, as seen in the drawings. Each slide $k$, has a small set screw $l$, adapted to it in such manner as to enable a person to confine the slide in any desirable position on its bar.

Extending along underneath the two rack bars G, and I, and at right angles to them is a shaft Q, on which two toothed pinions of an equal size are placed and fixed so as to work in the teeth of the two rack bars, and when revolved to move said rack bars simultaneously and with equal velocities. Now as the three bars K, O, and N, are arranged parallel to each other, and as the other three bars M, P, and L, are also disposed parallel to each other, the carriage B, when the two rack bars G and I, are moved with equal velocities, will be moved with a velocity which will be in the proportion to that of the carriage A, as the length of either side of the parallelogram made by parallel lines passing through the centers of the joints or joint pins $e$, and $g$, and those of the joints of the bars K, and M, L, and N, is to the length of its homologous side of the smaller parallelogram made by lines passing through the centers of the joint pins $d$, and $e$, and those of the joint pins of the joints of the bars O and M, and P, and N.

On the two carriages A, B, respectively are two other carriages or rectangular frames, R, S, each of which is supported upon the carriage on which it rests by contrivances which admit of the said carriage R, or S, being moved in lateral directions at right angles to those in which the carriages, A, B, move.

A rack bar T, is applied and fixed to the side of the carriage A, as seen in the drawings. Into this rack bar a toothed pinion V, plays. The said pinion turns on a transverse shaft V, (extending from end to end of the carriage R, and through said ends) and is fixed to a wheel W, by a tubular shaft X, which passes through the side of the carriage and revolves freely on the shaft V. The carriage R, is connected by bars Y, Z, to a horizontal frame $m$, the said bars Y, Z, being made to slide freely on the shaft V. The said frame $m$, is supported by the carriage B, in such manner as to be capable of being moved back and forth in directions at right angles to those in which said carriage B, is moved. The said frame $m$, is connected by a joint pin $n$, to another system of parallel rules or bars $o$, $p$, $q$, $r$, $s$, $t$, made and united and operating together substantially like the system hereinbefore described. The joint pin $u$, of the said second system of bars is connected to the carriage B, by a bar $w$, while the joint pin $v$, is connected to the carriage S. Thus by the said second system of parallel bars and other mechanism as described as applied to the two carriages R, and S, the carriage S may be made to move laterally with any desiable velocity in proportion to that of the carriage R.

There is a shaft V, extended across the carriage S, in the same manner in which the shaft V, is carried across the carriage R. Each shaft V, or V′, has a worm screw $x$, placed upon it and in the middle of it. The said worm works into a curved toothed arc $y$, projecting down from a pendulous or swinging frame Z, which is supported on journals playing in boxes on the tops of the standards $a'$, $b'$, of the frame or carriage R, or S, as seen in the drawings. Each shaft V or V′, has a wheel $c'$, fixed upon one end of it, for the purpose of enabling a person to rotate the shaft and thereby give to either frame Z, such an inclination in a transverse direction as may be desirable.

Each frame Z, supports a transverse rocker shaft $d'$, which rocks in bearings made in two standards $e'$, $f'$, of the frame. To the central part of each shaft $d'$, there is fixed a toothed sector or semicircle $g'$, which extends below the shaft and at right angles to it as seen in the drawings. Into each toothed sector $g'$, a worm or screw $h'$, on a shaft $i'$, is made to operate, the said shaft $i'$, being placed across and having its bearings in its rocking frame Z. There is a rotating wheel $k'$, fixed on each shaft $i'$, as seen in the drawings. Each shaft $i'$ is made to pass through a curved slot $l'$, made through the side of the carriage which supports its frame Z.

By turning either of the shafts $i'$, any desirable lateral inclination may be given to the chuck or tablet $m'$ or $n'$, supported by or upon the shaft $d'$, directly above the said shaft $i$. Consequently if a pattern O′, or bas relief is fixed on the tablet or chuck $m'$, and a piece of wood or other material $p'$, is placed on the tablet or chuck $n'$, the said pattern and piece of wood, may not only be arranged respectively at any desirable angle to the horizon, but may be moved both laterally or transversely at such different velocities and under the operations of the parts to be hereinafter explained as may be necessary to produce a copy of the pattern on any desirable enlarged scale.

A vertical slide or carriage frame $q'$, is raised on the main frame or seen in the drawings. It carries or supports two vertical carriages or frames $v'$, $s'$, which respectively play up and down in vertical directions and between parallel guide bars $t'$, $t'$.

The carriage $v'$, supports and carries the vertical guide spindle $u'$, while the other carriage carries the shaft $v'$, of the cutter or drill $w'$, which shaft $v'$ is to be revolved by a driving belt made to pass around and act upon a small pulley $w^2$, fixed on the shaft $v'$. The arrangement of the two carriages or frames $r'$, $s'$, with respect to one another and the tablets or chucks, is exhibited in the drawings.

In the rear of the two carriages is a rectangular frame $x'$, which is fastened at one end to the carriage $r'$, and is jointed at the other end by the joint pin $y'$, to a third system of parallel bars $a^2$, $b^2$, $c^2$, $d^2$, $e^2$, $f^2$, made, arranged, and connected together substantially, like the system K, L, &c., hereinfirst described, the said third system of bars being jointed at $g^2$, to the frame $s'$; and also at $h^2$, to a short bar $i^2$, which is connected to a bar $k^2$, fixed to the upright frame $q'$.

The frame $x'$, is connected to a treadle $l^2$, by means of a lever $m^2$, and two connecting bars $n^2$, $o^2$, the same being made, joined, and arranged, in such manner as to enable a person by placing his foot on the treadle to elevate the said frame, and thereby elevate the two frames $r'$, $s'$, which will move up or down with different velocities, caused by the action of their system of parallel bars, the said velocities being regulated to correspond in proportion with those of the horizontal, lateral, or transverse movements of the pattern and block from which the copy is to be made.

Each tablet or chuck $m'$ or $n'$, may be fixed on the top of a vertical shaft $p^2$, made to pass through and have a bearing in the rocker shaft $d'$, under it, and to turn on a pivot or step at its foot, the object of the same being to allow the horizontal rotation of the tablet or of its being turned around as occasion may require, it being determined or held in position, by a spring catch $q^2$, projected from the rocker shaft, and made to take into suitable notches or holes made in the tablet.

From the above description it will be readily seen how by means of the cutting tool, a copy of larger size than the pattern is made when the model or pattern is placed under the action of the pattern spindle, and moved under it various directions, while the said spindle is suffered to rest upon the pattern and be elevated or depressed by the elevations or depressions of the surface of the pattern.

What I claim as my invention is—

1. The peculiar system of jointed parallel bars, moving frame, or two rack bars, in combination with each other, and either of the two moving carriages, and made to operate in manner so as to impart to one of said carriages a greater degree of velocity of motion than the other under the circumstances and for the purpose of moving the tablets or chucks and making a copy of enlarged dimensions all as above described.

2. And I also claim the combination of the two sets of carriages A, and B, R, and S, and their two sets or systems of parallel bars and moving frame and rack bars as applied together and combined with the tablets substantially in manner and for the purpose of imparting to the tablets lateral and transverse movements, at different velocities as specified, and for the purpose as hereinbefore explained.

3. And I also claim the frame Z, of each tablet and the mechanism for giving to it a transverse dip or inclination, in combination with its carriage R, S and the rocker shaft and mechanism for inclining and turning the tablet in lateral and other directions as specified.

In testimony whereof I have hereto set my signature this eleventh day of April A. D. 1848.

HEZEKIAH AUGUR.

Witnesses:
   JAMES T. MIX,
   L. A. DAGGETT.